(No Model.)
J. H. JONES.
PUSH BAR FOR MOWING MACHINES.
No. 504,419. Patented Sept. 5, 1893.
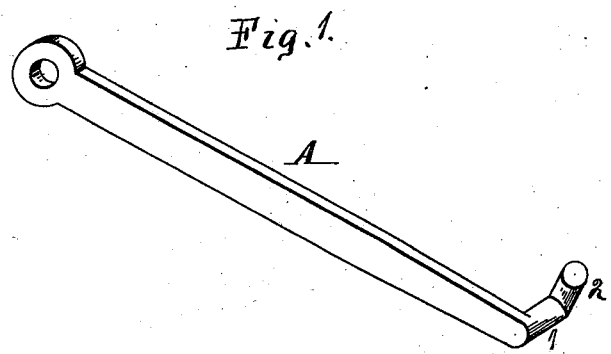
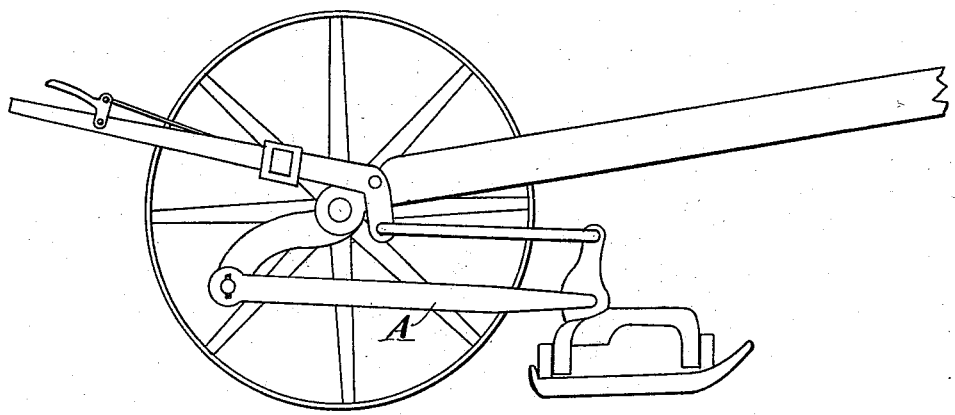
Witnesses:
E. Behel.
A. Davenport.
Inventor:
James Herva Jones
By A. O. Behel.
Atty.

UNITED STATES PATENT OFFICE.

UNITED STATES PATENT OFFICE.

JAMES HERVA JONES, OF ROCKFORD, ILLINOIS, ASSIGNOR TO EMERSON, TALCOTT & CO., OF SAME PLACE.

PUSH-BAR FOR MOWING-MACHINES.

SPECIFICATION forming part of Letters Patent No. 504,419, dated September 5, 1893.

Original application filed November 18, 1884, Serial No. 148,235. Divided and this application filed May 18, 1891. Serial No. 393,220. (No model.)

*To all whom it may concern:*

Be it known that I, JAMES HERVA JONES, a citizen of the United States, residing at Rockford, in the county of Winnebago and State of Illinois, have invented certain new and useful Improvements in Push-Bars for Mowing-Machines, of which the following is a specification.

This application is a division of an application filed November 18, 1884, Serial No. 148,235.

The object of this invention is to construct a push-bar for mowing machines, having its end bent to form a self-lock in its connection with the coupling-bar.

In the accompanying drawings Figure 1, is an isometrical representation of the push bar embodying the features of my invention. Fig. 2, shows its application to a mowing machine.

This push-bar A is designed to connect the cutting apparatus of a mowing machine with the main frame in such manner as to permit the cutting apparatus to have free rocking and vertical rising and falling movements, which are necessary for the successful manipulation of the machine. This push-bar is of rectangular bar form, having one end formed with an eye and its other end in cylindrical form, having a section 1 bent at right angles to the main portion of the bar, and another section 2, bent at right angles to the section 1. This push-bar is placed in position by passing the sections 1 and 2 through an eye formed in a portion of the coupling-bar portion of the cutting apparatus, and the main portion of the push-bar is then turned rearward and its eye portion placed over a stud or other portion of the main frame of the mowing machine, and secured in such position in any suitable manner.

I claim as my invention—

The combination with the main frame, and the coupling-bar perforated as described, of a push-bar pivotally connected at its rear end with the main frame and provided at its forward end with a projection 1 substantially at right angles to the bar, and a further projection 2, substantially at right angles to the projection 1, whereby the said push-bar is made self-locking when the projections on its front end are inserted in the perforation on the coupling-bar and the bar swung into position for use.

JAMES HERVA JONES.

Witnesses:
AUGUST LIND,
A. O. BEHEL.